United States Patent [19]
Lynch et al.

[11] Patent Number: 5,785,850
[45] Date of Patent: Jul. 28, 1998

[54] CLEANABLE OIL FILTER

[75] Inventors: Donald C. Lynch, Minnetonka; Alan Lonneman, Plymouth, both of Minn.

[73] Assignee: Certified Technologies Corp., Minneapolis, Minn.

[21] Appl. No.: 819,169

[22] Filed: Mar. 17, 1997

[51] Int. Cl.$^6$ .................................................. B01D 35/02
[52] U.S. Cl. ........................ 210/304; 210/313; 210/440; 210/450; 210/456; 210/493.2; 210/499; 210/DIG. 17
[58] Field of Search ................... 210/304–306, 210/313, 320, 440, 444, 450, 456, 493.2, 499, 512.1, DIG. 17

[56] References Cited

U.S. PATENT DOCUMENTS

| | | | |
|---|---|---|---|
| 601,392 | 3/1898 | Bowden | 210/497.01 |
| 1,892,190 | 12/1932 | Russel | 210/440 |
| 1,908,925 | 5/1933 | Semon et al. | 210/443 |
| 1,976,914 | 10/1934 | Benjamin | 210/165 |
| 2,083,005 | 6/1937 | Czarnecki | 210/165 |
| 2,937,754 | 5/1960 | Kasten | 210/131 |
| 3,000,505 | 9/1961 | Scavuzzo | 210/132 |
| 3,095,283 | 6/1963 | Wheeler, Jr. | 29/191.6 |
| 3,122,501 | 2/1964 | Hultgren | 210/94 |
| 3,224,590 | 12/1965 | Nord et al. | 210/438 |
| 3,283,902 | 11/1966 | Farris et al. | 210/90 |
| 3,289,847 | 12/1966 | Rothemund | 210/266 |
| 3,400,821 | 9/1968 | Singleton | 210/136 |
| 3,508,383 | 4/1970 | Humbert, Jr. et al. | 210/304 |
| 4,132,641 | 1/1979 | Elsworth | 210/73 R |
| 5,047,148 | 9/1991 | Arai | 210/498 |
| 5,082,561 | 1/1992 | LaPierre | 210/232 |
| 5,234,592 | 8/1993 | Schneider | 210/440 |
| 5,342,519 | 8/1994 | Friedmann et al. | 210/232 |
| 5,387,340 | 2/1995 | Ackerman | 210/497.01 |
| 5,569,373 | 10/1996 | Smith et al. | 210/90 |

OTHER PUBLICATIONS

Capehart Lifetime Super Filter With Rare Earth Magnets–Brochure, date unknown.

*Primary Examiner*—Matthew O. Savage
*Attorney, Agent, or Firm*—Haugen & Nikolai, PA

[57] ABSTRACT

A device for filtering fluids which is cleanable and re-usable is described. The device includes a cylindrical canister, a cylindrical lid and a filter cartridge. The device is adapted to be disposed in a fluid flow circuit, filtering particulate from the fluid circulating therein. The filter cartridge is quickly removed, cleaned and reused. The fluid enters and exits the device from the top end through fluid inlets and an outlet extending through the lid perpendicular to the lids upper planar surface, thereby reducing the amount of space required to mount the device. The fluid inlets include sloping fins that direct fluids in the filtering chamber in a spiraling action, thereby increasing the effectiveness of the filter.

14 Claims, 5 Drawing Sheets

CLEANABLE OIL FILTER

BACKGROUND OF THE INVENTION

I. Field of the Invention

This invention relates generally to fluid filtration equipment, and more particularly to a re-usable and cleanable filtration device. The filtration device includes a filter cartridge which is sealably contained within a cylindrical canister and enclosed by a cylindrical lid having both the inlet and outlet extending therethrough, parallel with the canister's central axis, thereby reducing the amount of space required to mount the device. The device is adapted to be disposed in a fluid flow circuit, filtering particulate from the fluid circulating therein. The fluid inlets include sloping fins for directing fluids into the filtering chamber in a spiraling direction, thereby enhancing the efficiency of the filter.

II. Discussion of the Related Art

Various devices and methods are used to filter unwanted particulate circulating in the fluid of a fluid flow circuit. For example, in the past sand has been used to filter particulate from fluid passing through the sand. In such a filter, small particulate pass through the sand, avoiding the filtering mechanism. Other filtering means, such as pleated cotton paper, may effectively filter particulate to approximately the 25-30 micron size, however the pleated paper is not effectively cleanable or re-usable. With the increasing number of overfull landfills, it has become ever important that a product be re-usable. Therefore, there is a need for an efficiently cleanable, re-usable oil filter.

A fluid filtering and treating apparatus was disclosed by P. W. Rothemund in U.S. Pat. No. 3,289,847 (the '847 patent). The filter includes a cylindrical housing having a cover, whereby two separate filters are contained therein. The cover has an inlet and an outlet extending therethrough, perpendicular to the central axis of the housing. The fluid flows into the inlet and is directed through a guide channel and into a chamber containing the first filter. The path of the fluid through the fluid inlet is relatively direct. Pressure forces the fluid through the first filter towards the center of the chamber. A smaller second filter is positioned encircled by the first filter. Pressure forces the fluid through the second filter towards the center. The outlet horizontally extends out a side of the cover, directing the filtered fluid out of the filter's cover.

The '847 patent describes the filter as strips of filter fabric wound around tubular members. The tubular members are necessary to support the filter fabric. In such a system, the strips may slide out of position, thereby reducing the effectiveness of the filter. A seal is positioned on a top surface of the tubular member. The cover must be turned onto the housing far enough so that the cover presses down on the tubular member, compressing the seal. Dirt or other particulate may inhibit the cover from pressing firmly against the tubular member, thereby reducing the effectiveness of the seal and further allowing unfiltered fluid back into the system.

Other filtering systems, such as that disclosed by Elsworth, U.S. Pat. No. 4,132,641 (the '641 patent) utilize a filter held in place by a through bolt. Cleaning or replacing this type of filter requires additional time, reducing the efficiency of changing the filter. Still other filters are open on both ends, requiring the filter to make sealing contact with both the cover and housing. This sort of arrangement increases the likelihood that an amount of unfiltered fluid will return into the fluid flow circuit.

Still other filtering systems, such as those disclosed by Friedmann et al., U.S. Pat. No. 5,342,519 (the '519 patent) and Smith et al., U.S. Pat. No. 5,569,373 (the '373 patent) describe generally a reusable filter having a mounting head assembly, wherein bores or apertures extend through the mounting head assembly to form fluid inlets that are aligned with unfiltered oil ports of the engine block. A need exists for a mounting head assembly that swirls the fluids entering the filtering chamber without substantially influencing the pressure of the fluid entering the filtering chamber.

A specific example will now be discussed to further demonstrate the need for a re-usable fluid filter that is easily removed, cleaned, re-installed and which reduces the amount of required space for mounting the filter within a fluid flow circuit. The longevity of oil used to lubricate moving parts in an engine is found to vary depending on the extent of filtration and removal of impurities from the oil before the oil composition breaks down. While most engines have some sort of oil filtering device, contaminants remain in the oil which leads to a break down in the oil composition. Currently, filters using a cotton substrate are commonly used to filter the oil. The filters are disposed of after use.

Fleets of trucks require continuous maintenance and consequently frequent oil filter changes. The restricted amount of space around the vehicles engine requires a filter mount that effectively utilizes the engine space. Providing a cleanable and reusable oil filter would significantly reduce the amount of environmental waste and would further reduce the cost associated with changing the oil filters on an entire fleet of trucks. The present invention overcomes these and other disadvantages by providing a re-usable filtering device that is positioned parallel with the fluid flow circuit, wherein the filter cartridge is economically removed, cleaned and re-used.

SUMMARY OF THE INVENTION

The problems identified above are solved in accordance with the present invention by providing an oil filtering device that comprises a hollow cylindrical canister having an open end, a closed end, a filter cartridge that fits within the canister, and a cylindrical lid assembly which sealably engages with the open end of the canister. The filter cartridge further comprises a top cap, bottom cap and a filtering medium sealably affixed between the top cap and bottom cap.

In the preferred embodiment, the canister is cylindrical in shape, having threads on an inner surface of the canister proximate the open end. A concentric shoulder extending from a bottom planar surface of the lid is threaded, whereby the lid may be turned onto the canister. A quad-ring is positioned between the top open end of the canister and a bottom planar surface of the lid. As the lid is turned onto the canister, the quad-ring is compressed between the two surfaces, thereby sealably engaging the lid and canister. A petcock is sealably attached to the bottom of the canister. The petcock allows the user to drain the fluid contained within the canister, before removing the canister from the lid.

A partially tapered central bore or outlet extends through the lid, parallel with a longitudinal axis of the lid. The central bore has a threaded inside surface, whereby the central bore may be turned onto a threaded shaft of, for example, the engine oil flow circuit. A second annular shoulder extends from the lid's planar lower surface, thereby defining the lower opening to the central bore. A segmented annular fluid passage extends through the lid, parallel with the central bore. The fluid passage is segmented by a plurality of sloped fins that direct fluids in a spiraling fashion from the upper planar surface to the lower planar surface without substantially affecting the fluid's pressure as it enters the filtering canister.

The annular top cap of the filter cartridge has a central opening extending through the top cap. Extending from an upper surface of the top cap is an annular ring. The annular ring is dimensioned to slidingly engage the outer cylindrical surface of the second concentric shoulder, thereby eliminating the need for a through bolt or compression spring used to press the filter against the lid. The annular ring further acts as a spacer between the upper surface of the annular top cap and the lower planar surface of the cylindrical lid.

As the fluid pours through the fluid inlets, an increased turbulence is created as the fluid flows over the sloped fins and onto the upper surface of the top cap. The increased turbulence mixes the fluid and mixes the particulate throughout the fluid. The fluid then continues to flow down and around the filtering medium in a spiraling direction. In the preferred embodiment, the filtering medium is comprised of a pleated thin wire meshing having symmetric perforations. Varying sizes of wire meshing may be used, wherein the perforation width ranges between 10 to 60 microns, however, in the preferred embodiment a 15 micron mesh is preferred.

The bottom cap of the filter cartridge is closed and the filter medium is welded or otherwise sealably engaged in a trough of each of the top and bottom caps using known compositions. Hence, the fluid being directed through the fluid passage encircles the filter, passes through the mesh, and exits through the lid's central bore. A second wire mesh or inner frame is also sealably engaged to the top and bottom cap. Without limitation, the inner frame is rigid, made of a thicker gauge wire, and has large perforations, whereby the fluid freely passes through the large perforations. As fluid passes through the outer filter under pressure, the outer filter has a tendency to collapse inward. The inner frame reduces the amount that the outer filter collapses inward. The filter cartridge is easily removed from the canister, reducing the amount of time necessary to change the fluid flow circuit's filter.

It is accordingly a principal object of the present invention to provide a device for filtering fluids which is re-usable and efficiently cleaned, thereby reducing the amount of time required to replace the filter.

Another object of the present invention is to provide a device for filtering fluids that is simple, efficient and economical to use.

Still another object of the present invention is to provide a filtering device that reduces the amount of mounting space required to mount the filter within the fluid flow circuit.

Yet another object of the present invention is to provide a filter assembly that directs fluid in a spiraling fashion towards the filtering medium.

These and other objects and advantages as well as these and other features will become apparent to those skilled in the art from the following detailed description of a preferred embodiment of the invention, especially when considered in conjunction with the accompanying drawings in which like numerals in the several views refer to corresponding parts.

DETAILED DESCRIPTION OF THE PREFERRED EMBODIMENT

Figure 1:
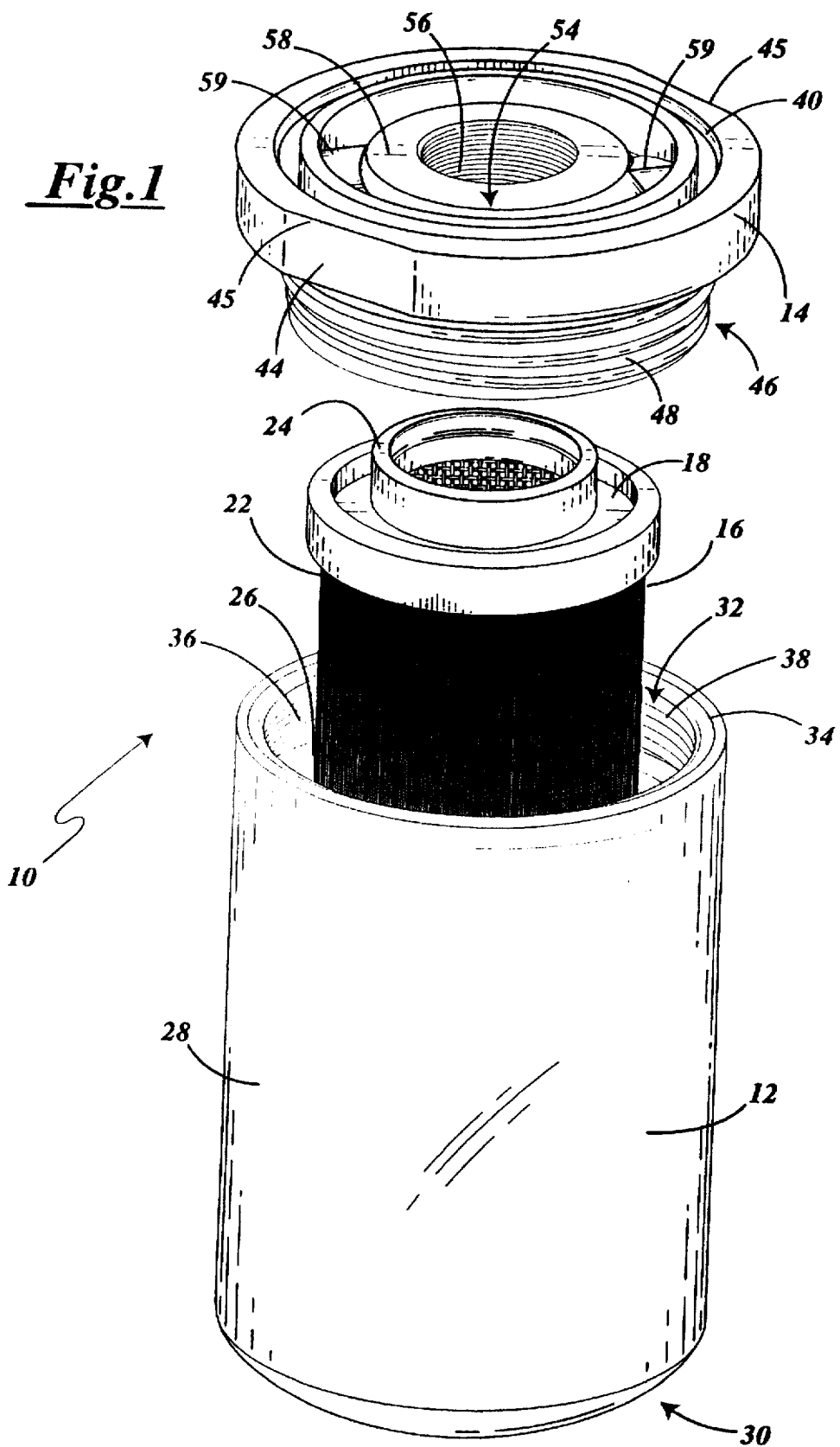
FIG. 1 is an exploded, perspective view of the oil filtration device of the present invention.

Referring first to FIG. 1, an exploded perspective view of the filtration device 10 is generally shown. The filtration device comprises a cylindrical canister 12, a cylindrical lid 14, and a filter cartridge 16. The filter cartridge 16 further consists of an annular top cap 18, a cylindrical closed bottom cap 20, an outer filter mesh 22, and an inner frame 24 (see FIGS. 3 and 6).

The canister 12 is cylindrical in shape, thereby reducing the amount of resistance to fluid flow. The canister has inner and outer sidewalls 26 and 28, a closed bottom end 30, and an open top end 32. A distance near the open top end 32, between the inner and outer sidewalls 26 and 28, is greater than a distance between the inner and outer sidewalls 26 and 28 near the bottom end 30. A relatively planar, annular top surface 34 is formed between the inner and outer sidewalls 26 and 28, proximate the open top end 32. Threading 36 extends around a portion of the inner sidewall 26 proximate the open top end 32. A tapered top edge 38 between the annular top surface 34 and the threaded inner sidewall 26 provides a sealing surface.

Figure 2:
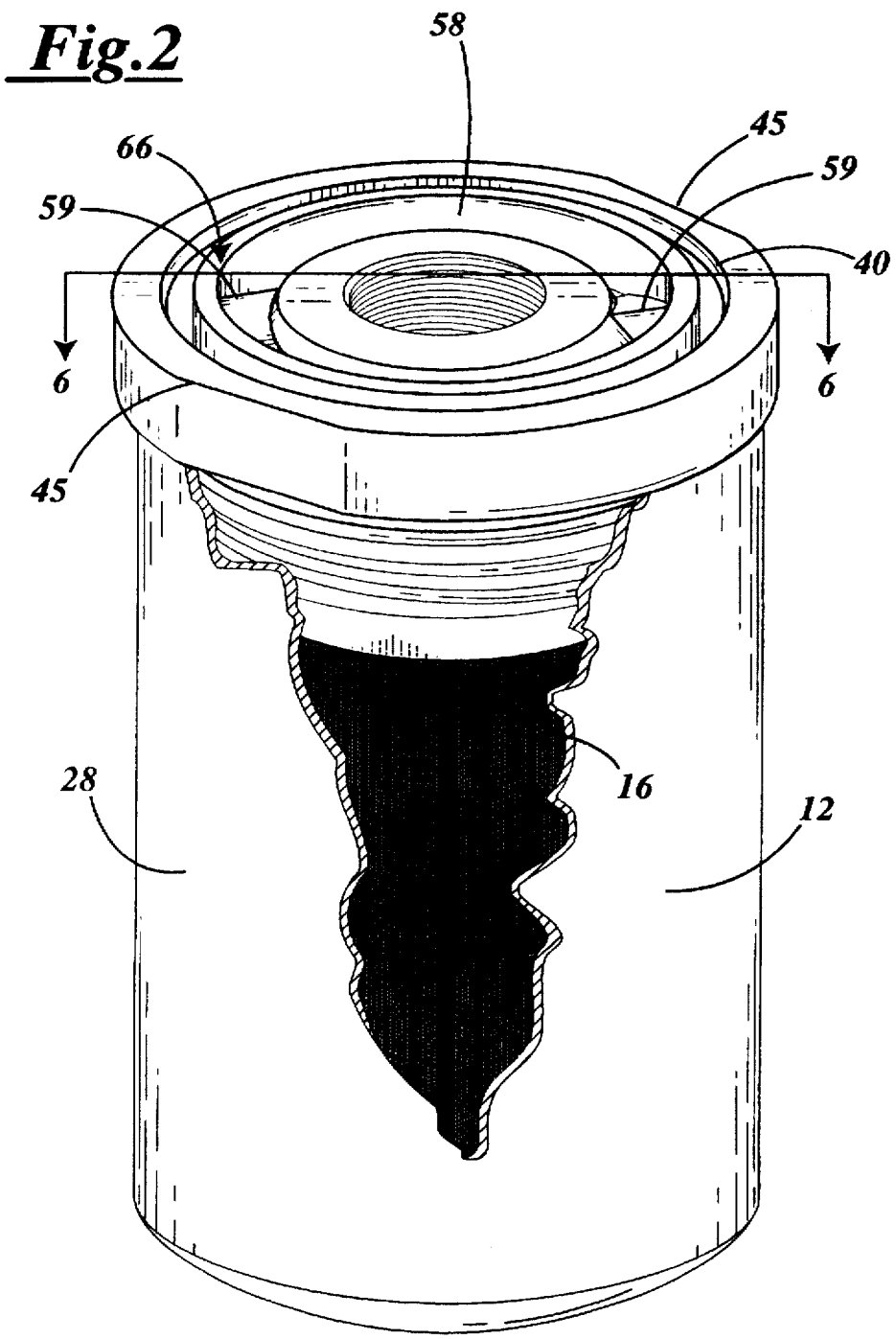
FIG. 2 is a partial sectional perspective view of the filtration device of the type shown in FIG. 1.
Figure 3:
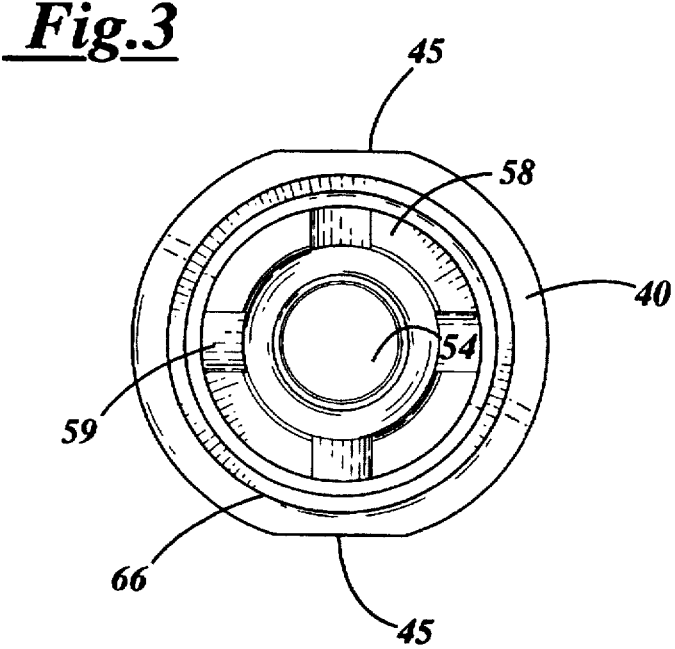
FIG. 3 is a top elevational view of the cylindrical lid of the type shown in FIG.1.
Figure 4:
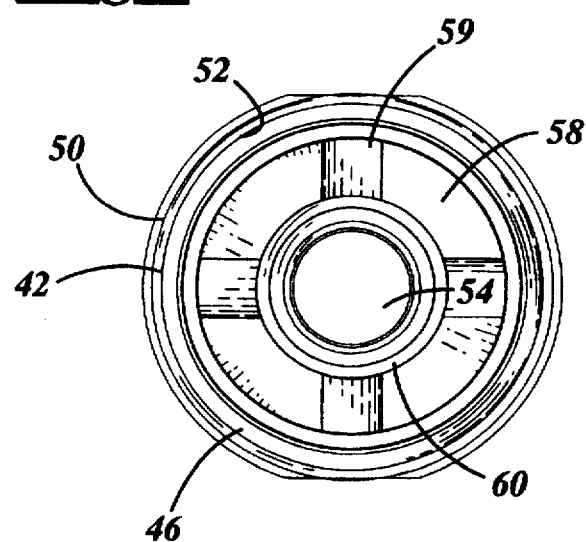
FIG. 4 is a bottom elevational view of the cylindrical lid of the type shown in FIG. 1.

Referring next to FIGS. 2-4, the cylindrical lid 14 is shown. The cylindrical lid has upper and lower planar surfaces 40 and 42 parallely spaced and separated by a cylindrical sidewall 44 of the lid 14. The sidewall 44 has two parallely opposing flats 45 formed thereon, whereby a wrench may be slid over the flats 45 to hold the lid 14 in place. A first offset annular member 46 extends perpendicularly from the lower planar surface 42. Threading 48 extends around the outer surface 50 of the first annular member 46.

The first annular member 46 is dimensioned, whereby the threading 48 on the first annular shoulder 46 rotatably engages with the threading 36 of the canister 12. Those skilled in the art will recognize that threading 36 of the canister 12 could alternatively extend from the outer sidewall 28 proximate the open top end 32, and the inner surface 52 of the first annular member 46 could be dimensioned having threading 48 to engage with the outer sidewall 28 of the canister 12.

A central bore 54 having internal threading 56 extends through the lid 14 between the lid's upper and lower planar surfaces 40 and 42. The threaded central bore 54 is dimensioned to turn onto an intake shaft of the fluid flow circuit. Also, the lid 14 has a segmented annular fluid passage 58 extending therethrough, between the upper and lower planar surfaces 40 and 42. The fluid passage 58 is spaced between the first annular member 46 and the central bore 54. Sloped fins 59 segment the annular fluid passage and direct fluids into the canister 12 in a spiraling motion about filter cartridge 16.

A second annular member 60 extends from the lid's lower planar surface 42, thereby defining the opening to the central bore 54. A groove 66 is recessed in the upper planar surface 40 of the lid 14 between the lid sidewall 44 and the annular fluid passage 58. The groove 66 is dimensioned to retain an quad-ring 68, or other known seal therein. The quad-ring 68 provide an increased sealing surface over O-rings and are preferred.

Figure 5:
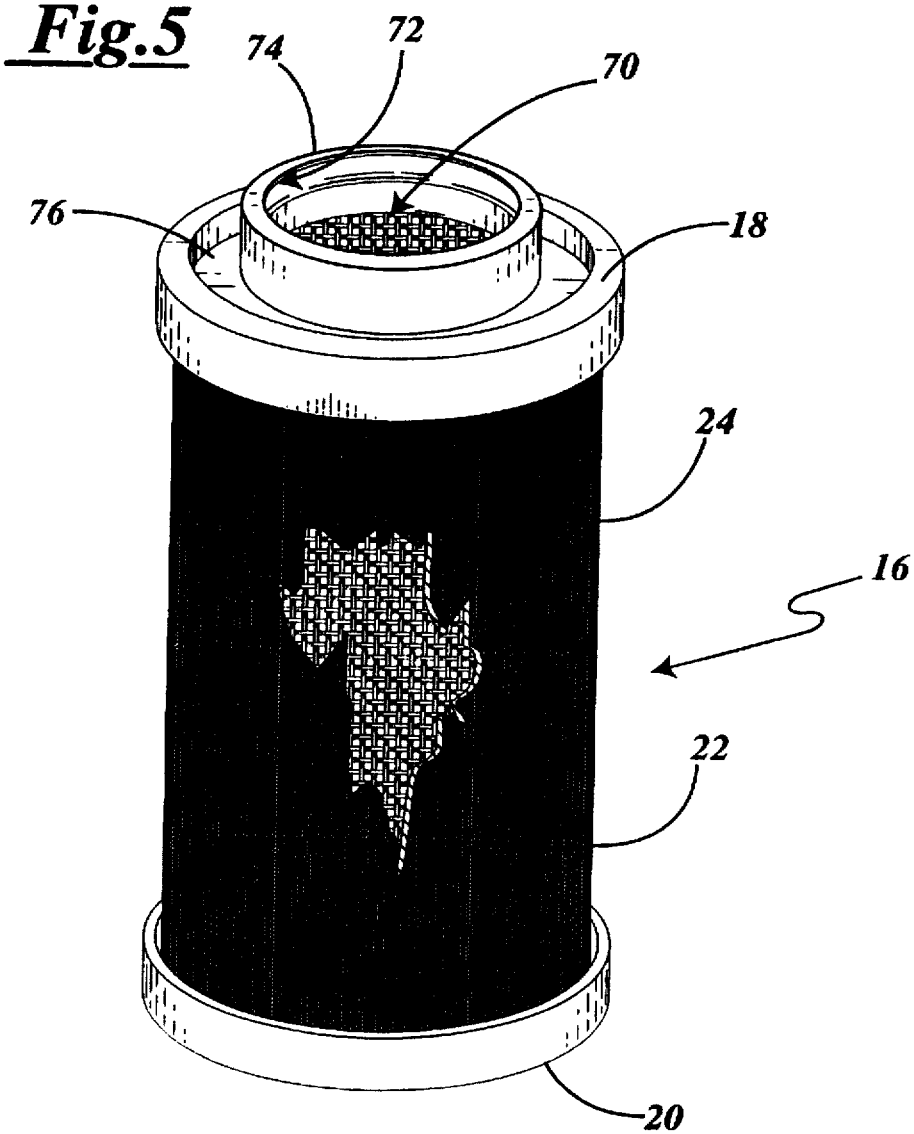
FIG. 5 is a partial sectional perspective view a filter cartridge of the present invention.

Referring next to FIG. 5, the filter cartridge 16 is generally shown. The annular top cap 18 of the filter cartridge 16 is has an opening 70 designed to slidingly engage with an outer surface of the second annular member 60 of the lid 14. An annular recess 72 is formed within the opening 70, wherein an O-ring or other known seal is positioned, to thereby seal the filter cartridge 16 with the lid 14 (see also FIG. 6). An annular ring 74 extends from a top surface of the open top end 32, proximate the opening 70. When the filter cartridge 16 is securely engaged with the lid 14, the annular ring separates the top surface of the open top end 32 and the lower planar surface 42 of the lid 14.

The closed cylindrical bottom cap 20 and the annular top cap 18 are aligned and sealed to the outer filter mesh 22. The seal may be formed by welding or by a known composite. Likewise, the inner frame 24 is sealed to the top and bottom caps 18 and 20. An annular trough 76 is formed in the top cap and is adapted for receiving an adhesive or other known bonding agent to secure the pleated filter mesh to the top cap 18. Likewise an annular trough is formed in the bottom cap 20 and is adapted for receiving an adhesive or other known bonding agent to secure the pleated filter mesh to the bottom cap 20. Without any limitation intended, the cylindrical pleated outer filter mesh is formed from a wire meshing having symmetric perforations. The width of the perforation determines the size of the particulate that is filtered out of the fluid passing through the mesh 22. In the preferred embodiment a 15 micron mesh is used. The inner frame defines the shape of the filter and reduces the amount the outer filter mesh collapses inward as fluid pressure is asserted against the outer filter mesh. The inner frame has large perforations, allowing the filtered fluid to pass therethrough without noticeable amounts of resistance.

Figure 6:
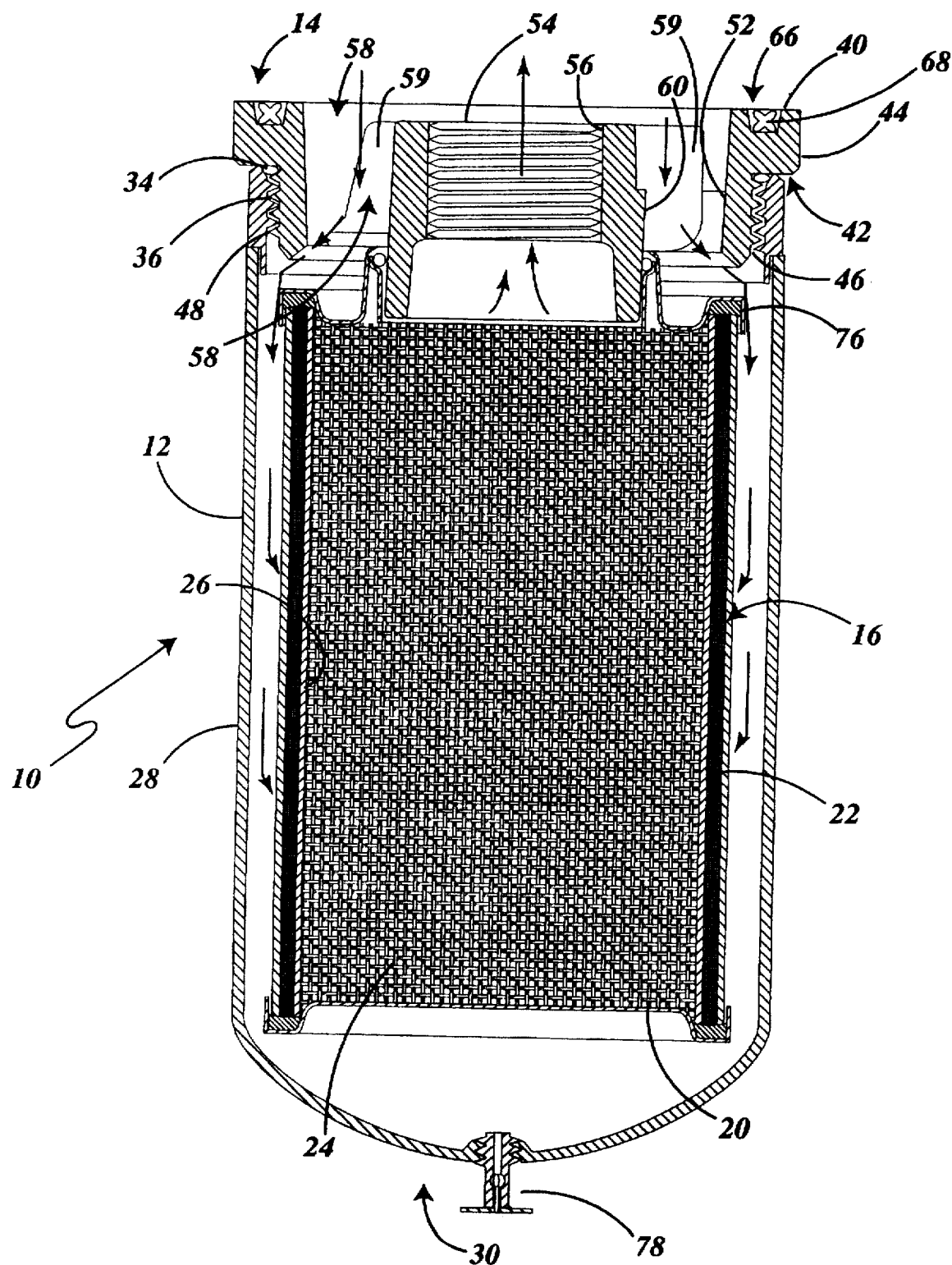
FIG. 6 is cross-sectional view taken along line 6—6 of FIG. 2.

Referring now to FIG. 6, the vector flow of fluid through the filtration device 10 is shown in cross-section. When the threading 48 of the cylindrical lid 14 is rotatably engaged with the mating threading 36 of the canister 12, an O-ring of suitable construction is compressed between the tapered top edge 38 of the canister 12 and the lower planar surface 42 of the lid 14. The lid 14 is engaged to the fluid flow circuit and sealed by quad-ring 68. Fluid travels from the fluid flow circuit into the segmented annular fluid passage 58, over the sloped fins 59 and spirals into the canister 12. The fluid strikes the annular to cap 18 of the filter cartridge, thereby creating a further turbulence in the fluid flow. The spiraling turbulent action causes the particulate within the fluid to become mixed and separated, whereby the particulate is more evenly dispersed through the fluid. The fluid then travels around the top cap 18 and around the outer pleated filter mesh 22. Particulate larger than the perforations of the outer filter mesh 22 are trapped on the outside of the filter cartridge 16. The pleating in mesh 22 further enhances the ability to trap and filter the particulate swirling in the fluid flow. The fluid then passes through the outer filter mesh, the inner frame, up into the central bore 54, and out of the filtration device back into the fluid flow circuit.

When cleaning the filtration device, the user stops the fluid flow, opens a petcock of known construction 78 thereby draining the fluid from the canister, and rotationally disengages the canister 12 from the lid 14. The filter cartridge 16 is then slidingly disengaged from the lid 14. The filter 16 may then be cleaned by submersing in a detergent fluid and reversing the direction of flow of the fluid through the filter cartridge 16. As the fluid passes first through the frame 24 and then through the outer filter mesh 22, particulate is dislodged from the outer surface of the outer filter mesh 22. The filter cartridge 16 is then rinsed, and re-engaged to the lid 14.The canister 12 is then replaced and the filtration of fluid is continued.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself

What is claimed is:

1. A re-usable oil filtration device, comprising:
   (a) a cylindrical canister having concentrically disposed inner and outer sidewalls, an open top end and a closed bottom end;
   (b) a cylindrical lid closing the open top end of said canister, said lid having an upper planar surface and a lower planar surface and a central axis, wherein said lower planar surface faces in a direction toward the closed bottom of said canister and said upper planar surface faces in a direction away from the closed end of said canister, a first annular member extending from the lower planar surface concentric with said central axis, a central bore concentrically spaced within said first annular member and extending through said upper and lower planar surfaces having internal threading, and a segmented annular fluid inlet extending through said upper and lower planar surfaces and concentrically spaced between the first offset shoulder and the central bore, said segmented fluid inlet having a plurality of sloping fins disposed therein axially between said upper planar surface and said lower planar surface for segmenting said annular fluid inlet and directing fluids in a spiraling direction from the upper planar surface to the lower planar surface;
   (c) a filter cartridge having an annular top cap, a cylindrical closed bottom cap, means for filtering particulate sealably coupled therebetween, said top cap having a central opening extending therethrough, wherein the central opening is dimensionally greater than the central bore of the cylindrical lid;
   (d) means for sealably securing the open top end of the canister to the lower planar surface of said cylindrical lid; and
   (e) means for sealing the annular top cap of the filter cartridge with the lower planar surface of the cylindrical lid.

2. The re-usable oil filtration device as recited in claim 1, wherein the means for filtering comprises a pleated outer filter mesh and an inner frame having perforations dimensioned to allow fluid to pass therethrough.

3. The re-usable oil filtration device as recited in claim 2, wherein the outer filter mesh comprises a screen having perforated openings wherein a length and width of the perforated openings is sized between 10 and 60 microns.

4. The re-usable oil filtration device as recited in claim 1, further comprising an annular groove in the upper planar surface of said lid coaxially surrounding said segmented annular fluid inlet, and a quad-ring sealably disposed in said annular groove.

5. The re-usable oil filtration device as recited in claim 1, wherein the means for sealing the annular top cap of the filter cartridge with the lower planar surface of said cylindrical lid comprises an O-ring sealably engaged between an inner peripheral surface of the central opening of the annular top cap and an outer peripheral surface of a second annular member that coaxially defines said central bore.

6. A re-usable oil filtration device, comprising:
   (a) a cylindrical canister having concentrically disposed inner and outer sidewalls, an open top end and a closed bottom end;
   (b) a cylindrical lid closing the open top end of said canister, said lid having an upper planar surface and a lower planar surface and a central axis, wherein said lower planar surface faces in a direction toward the closed bottom of said canister and said upper planar surface faces in a direction away from the closed end of said canister, a first annular member extending from the lower planar surface concentric with said central axis, a central bore concentrically spaced within said first annular member and extending through said upper and lower planar surfaces having internal threading, and an annular segmented fluid passage extending through said upper and lower planar surfaces and concentrically spaced between the first offset shoulder and the central bore, said annular segmented fluid passage being segmented by a plurality of sloping fins disposed therein axially between said upper planar surface and said lower planar surface for directing fluids in a spiraling direction from the upper planar surface to the lower planar surface;
   (c) a filter cartridge having an annular top cap, a cylindrical closed bottom cap, an outer filter mesh and an inner frame having perforations dimensioned to allow fluid to pass therethrough, said outer filter mesh and inner frame are affixed between the annular top cap and the cylindrical closed bottom cap, said top cap having a central opening extending therethrough, wherein the central opening is dimensionally greater than the central bore of said cylindrical lid;
   (d) means for sealably securing the open top end of the canister with the lower planar surface of said cylindrical lid; and
   (e) means for sealing the annular top cap of the filter cartridge with the lower planar surface of the cylindrical lid.

7. The re-usable oil filtration device as recited in claim 6, further comprising an annular groove in the upper planar surface of said lid coaxially surrounding said segmented annular fluid inlet, and a quad-ring sealably disposed in said annular groove.

8. The re-usable filtration device as recited in claim 6, wherein the means for sealing the annular top cap of the filter cartridge with the lower planar surface of said cylindrical lid comprises an O-ring sealably engaged between an inner peripheral surface of the central opening of the annular top cap and an outer peripheral surface of a second annular member that coaxially defines said central bore.

9. The re-usable oil filtration device as recited in claim 6, wherein the outer filter mesh comprises a pleated screen having perforated openings wherein a length and width of the perforated openings is sized between 10 and 60 microns.

10. A re-usable oil filtration device, comprising:
    (a) a cylindrical canister having concentrically disposed inner and outer sidewalls, an open top end, a closed bottom end having a bore extending therethrough, a petcock attached to said closed bottom end and sealably surrounding said bore, wherein said inner sidewall has threading extending therefrom proximate the open top end;
    (b) a cylindrical lid closing the open top end of said canister, said lid having an upper planar surface and a lower planar surface and a central axis, wherein said lower planar surface faces in a direction toward the closed bottom of said canister and said upper planar surface faces in a direction away from the closed end of said canister, a first annular member extending from the lower planar surface concentric with said central axis, a central bore concentrically spaced within said first annular member and extending through said upper and lower planar surfaces having internal threading, a second annular member defining the central bore, and an annular segmented fluid passage extending axially through said upper and lower planar surfaces and spaced radially between the first annular member and the second annular member, said first annular member having threading extending around a radially outer surface thereof dimensioned to engage a threaded portion of the inner sidewall of said canister, said fluid passage being segmented by a plurality of sloping fins disposed therein axially between said upper planar surface and said lower planar surface for directing fluids in a spiraling direction from the upper planar surface to the lower planar surface;
    (c) a filter cartridge having an annular top cap having a central opening extending therethrough, a cylindrical closed bottom cap, and means for filtering particulate sealably coupled therebetween, said annular top cap having an annular ring extending axially therefrom proximate the central opening, wherein the central opening and annular ring are dimensioned to slidingly engage with the second annular member of said cylindrical lid;
    (d) means for sealably securing the open top end of the canister with the lower planar surface of the cylindrical lid; and
    (e) means for sealing the annular ring of the top cap of the filter cartridge with the second annular member of said cylindrical lid.

11. The re-usable oil filtration device as recited in claim 10, wherein the means for filtering comprises a pleated outer filter mesh and an inner frame having perforations dimensioned to allow fluid to pass.

12. The re-usable oil filtration device as recited in claim 10, further comprising an annular groove in the upper planar surface of said lid coaxially surrounding said segmented annular fluid inlet, and a quad-ring sealably disposed in said annular groove.

13. The re-usable oil filtration device as recited in claim 12, wherein the pleated outer filter mesh comprises a screen having perforated openings wherein a length and width of the perforated openings is sized between 10 and 60 microns.

14. The re-usable oil filtration device as recited in claim 10, wherein the means for sealing the annular ring of the filter cartridge with the second annular member of said cylindrical lid comprises an O-ring sealably engaging the annular ring and second annular member, wherein said O-ring is positioned in an annular groove extending around an inner surface of said annular ring.

\* \* \* \* \*